United States Patent
Way et al.

(10) Patent No.: US 8,778,058 B2
(45) Date of Patent: Jul. 15, 2014

(54) MULTILAYER SULFUR-RESISTANT COMPOSITE METAL MEMBRANES AND METHODS OF MAKING AND REPAIRING THE SAME

(75) Inventors: J. Douglas Way, Boulder, CO (US); Oyvind Hatlevik, Denver, CO (US)

(73) Assignee: Colorado School of Mines, Golden, CO (US)

(*) Notice: Subject to any disclaimer, the term of this patent is extended or adjusted under 35 U.S.C. 154(b) by 351 days.

(21) Appl. No.: 13/183,579

(22) Filed: Jul. 15, 2011

(65) Prior Publication Data

US 2012/0012004 A1    Jan. 19, 2012

Related U.S. Application Data

(60) Provisional application No. 61/365,114, filed on Jul. 16, 2010.

(51) Int. Cl.
  *B01D 71/02* (2006.01)
  *B01D 53/22* (2006.01)
  *B01D 67/00* (2006.01)
  *B05D 3/02* (2006.01)
  *B05D 3/10* (2006.01)

(52) U.S. Cl.
  USPC ............... 96/11; 95/56; 427/226; 427/383.1; 427/343; 427/404

(58) Field of Classification Search
  USPC ........ 96/4, 11; 95/45, 55, 56; 427/226, 383.1, 427/343, 404
  See application file for complete search history.

(56) References Cited

U.S. PATENT DOCUMENTS

| | | |
|---|---|---|
| 2,773,561 A | 12/1956 | Hunter |
| 3,155,467 A | 11/1964 | Yamamoto et al. |
| 3,350,845 A | 11/1967 | McKinley |
| 3,439,474 A | 4/1969 | McKinley |
| 3,849,076 A | 11/1974 | Gryaznov et al. |
| 3,881,891 A | 5/1975 | Goltsov et al. |
| 4,179,470 A | 12/1979 | Mischenko et al. |
| 4,313,013 A | 1/1982 | Harris |
| 4,343,013 A | 8/1982 | Bader et al. |
| 4,496,373 A * | 1/1985 | Behr et al. ............ 96/11 |
| 4,911,803 A | 3/1990 | Kunz |

(Continued)

FOREIGN PATENT DOCUMENTS

| | | |
|---|---|---|
| EP | 0783919 | 7/1997 |
| EP | 1096026 | 5/2001 |

(Continued)

OTHER PUBLICATIONS

Morreale et al. "Effect of hydrogen-sulfide on the hydrogen permeance of palladium-copper alloys at elevated temperatures," Journal of Membrane Science, Oct. 2004, vol. 241, No. 2, pp. 219-224.

(Continued)

*Primary Examiner* — Jason M Greene
(74) *Attorney, Agent, or Firm* — Sheridan Ross PC

(57) ABSTRACT

The invention relates to thin, hydrogen-permeable, sulfur-resistant membranes formed from multi-layers of palladium or palladium-alloy coatings on porous, ceramic or metal supports, methods of making these membranes, methods of repairing layers of these membranes and devices that incorporate these membranes.

21 Claims, 7 Drawing Sheets

(56) References Cited

U.S. PATENT DOCUMENTS

| | | | |
|---|---|---|---|
| 5,139,541 A | 8/1992 | Edlund | |
| 5,149,420 A * | 9/1992 | Buxbaum et al. | 205/219 |
| 5,215,729 A | 6/1993 | Buxbaum | |
| 5,451,386 A | 9/1995 | Collins et al. | |
| 5,498,278 A | 3/1996 | Edlund | |
| 5,518,053 A | 5/1996 | Robison | |
| 5,518,530 A | 5/1996 | Sakai et al. | |
| 5,645,626 A | 7/1997 | Edlund et al. | |
| 5,652,020 A | 7/1997 | Collins et al. | |
| 5,738,708 A | 4/1998 | Peachey et al. | |
| 5,888,273 A | 3/1999 | Buxbaum | |
| 5,904,754 A | 5/1999 | Juda et al. | |
| 5,931,987 A | 8/1999 | Buxbaum | |
| 5,980,989 A | 11/1999 | Takahashi et al. | |
| 5,997,594 A | 12/1999 | Edlund et al. | |
| 6,086,729 A | 7/2000 | Bredesen et al. | |
| 6,103,028 A | 8/2000 | Juda et al. | |
| 6,152,984 A | 11/2000 | Drnevich | |
| 6,152,987 A | 11/2000 | Ma et al. | |
| 6,152,995 A | 11/2000 | Edlund | |
| 6,168,650 B1 | 1/2001 | Buxbaum | |
| 6,171,574 B1 | 1/2001 | Juda et al. | |
| 6,183,543 B1 | 2/2001 | Buxbuam | |
| 6,214,090 B1 | 4/2001 | Dye et al. | |
| 6,221,117 B1 | 4/2001 | Edlund et al. | |
| 6,238,465 B1 | 5/2001 | Juda et al. | |
| 6,267,801 B1 | 7/2001 | Baake et al. | |
| 6,319,306 B1 | 11/2001 | Edlund et al. | |
| 6,372,363 B1 | 4/2002 | Krueger | |
| 6,375,906 B1 | 4/2002 | Edlund et al. | |
| 6,376,113 B1 | 4/2002 | Edlund et al. | |
| 6,383,670 B1 | 5/2002 | Edlund et al. | |
| 6,416,729 B1 | 7/2002 | DeBerry et al. | |
| 6,419,728 B1 | 7/2002 | Edlund | |
| 6,451,464 B1 | 9/2002 | Edlund et al. | |
| 6,458,189 B1 | 10/2002 | Edlund et al. | |
| 6,461,408 B2 | 10/2002 | Buxbaum | |
| 6,465,118 B2 | 10/2002 | Dickman et al. | |
| 6,494,937 B1 | 12/2002 | Edlund et al. | |
| 6,495,227 B1 | 12/2002 | Cahuzac | |
| 6,537,352 B2 | 3/2003 | Edlund et al. | |
| 6,540,813 B2 | 4/2003 | Nelson et al. | |
| 6,541,676 B1 | 4/2003 | Franz et al. | |
| 6,562,111 B2 | 5/2003 | Edlund et al. | |
| 6,569,227 B2 | 5/2003 | Edlund et al. | |
| 6,576,350 B2 | 6/2003 | Buxbaum | |
| 6,596,057 B2 | 7/2003 | Edlund et al. | |
| 6,649,291 B1 | 11/2003 | Iijima et al. | |
| 6,649,559 B2 | 11/2003 | Drost et al. | |
| 6,761,929 B2 | 7/2004 | Damle | |
| 6,916,454 B2 | 7/2005 | Alvin | |
| 7,749,305 B1 * | 7/2010 | Bossard et al. | 95/56 |
| 8,119,205 B2 | 2/2012 | Roa et al. | |
| 8,163,064 B2 | 4/2012 | Bredesen et al. | |
| 2003/0190486 A1 | 10/2003 | Roa | |
| 2004/0244583 A1 * | 12/2004 | Ma et al. | 95/55 |
| 2005/0109609 A1 | 5/2005 | Rei et al. | |
| 2006/0093848 A1 | 5/2006 | Senkevich et al. | |
| 2008/0038567 A1 * | 2/2008 | Way et al. | 427/383.1 |
| 2008/0210088 A1 | 9/2008 | Pledger | |
| 2009/0000480 A1 | 1/2009 | Dardas et al. | |
| 2009/0176012 A1 | 7/2009 | Way et al. | |
| 2010/0092353 A1 | 4/2010 | Noda | |

FOREIGN PATENT DOCUMENTS

| | | |
|---|---|---|
| JP | 63-295402 | 1/1988 |
| JP | 63-294925 | 12/1988 |
| JP | 8-266876 | 10/1996 |
| JP | 9-029079 | 2/1997 |
| JP | 10-203802 | 8/1998 |
| WO | WO 01/53005 | 7/2001 |
| WO | WO 2006/031080 | 3/2006 |

OTHER PUBLICATIONS

Gade et al. "Palladium-ruthenium membranes for hydrogen separation fabricated by electroless co-deposition," International Journal of Hydrogen Energy, 2009, vol. 34, pp. 6484-6491.

Aggarwal, et al., "Spontaneous Ordering of Oxide Nanostructures", Science, Mar. 24, 2000, Voil. 287, pp. 2235-2237.

Alefeld, et al., (eds), Hydrogen in Metals I: Basic Properties, 1978, pp. 324-326, 342-348, Springer-Verlag, Berlin, Germany.

Ali, et al. "Irreversible Poisoning of Pd-Ag Membranes", International Journal of Hydrogen Energy, 1994, vol. 19, No. 11, pp. 877-880, Elsevier Science Ltd., London, UK.

Amandusson, et al., "The effect of CO and O2 on hydrogen permeation through a palladium membrane", Applied Surface Science, 2000, vol. 153, pp. 259-267.

Armor "Applications of Catalytic Inorganic Membrane Reactors to Refinery Products", Journal of Membrane Science, 1998, vol. 147, pp. 217-233, Elsevier Science B.V., Amsterdam, The Netherlands.

Armor, "Membrane Catalysis: Where Is It Now, What Needs to Be Done?", Catalysis Today, 1995, vol. 25, pp. 199-207, Elsevier Science B.V., Amsterdam, The Netherlands.

Barbieri, et al. "Methane Steam Reforming Analysis in a Palladium-Based Catalytic Membrane Reactor", Industrial & Engineering Chemistry Research, 1997, vol. 36, pp. 3396-3374, American Chemical Society, Washington, DC, USA.

Benesi, et al. "Preparation of Highly Dispersed Catalytic Metals: Platinum Supported on Silica Gel", Journal of Catalyis, 1968, vol. 10, pp. 328-335, Academic Press, London, UK.

Berseneva, et al., "Alloys of Palladium With Metals of the Platinum Group as Hydrogen-Permeable Membrane components at High Temperature of Gas Separation", International Journal of Hydrogen Energy, 1993, vol. 18, No. 1, pp. 15-18, Pergamon Press Ltd., Great Britian.

Brey, et al., "Hydrogen as an energy carrier and its production by nuclear power", International Atomic Energy Agency, 1999, IAEA-TECDOC-1085, Vienna Austria, pp. 1-348.

Buxbaum, et al., "Hydrogen Transport Through Tubular Membranes of Palladium-Coated Tantalum and Niobium", Industrial & Engineering Chemistry Research, 1996, vol. 35, pp. 530-537, American Chemical Society, Washington, DC, USA.

Cheng et al., "Effects of electroless plating chemistry on the synthesis of palladium membranes," Journal of Membranes, 2001, vol. 182, pp. 195-203.

Collins, et al., "Catalytic Dehydrogenation of Propane in Hydrogen Permselective Membrane Reactors", Industrial & Engineering Chemistry Research, 1996, vol. 35, pp. 4398-4405, American Chemical Society, Washington, DC, USA.

Collins, et al., "Preparation of Characterization of a Composite Palladium-Ceramic Membrane", Industrial & Engineering Chemistry Research, 1993, vol. 32, pp. 3006-3013, American Chemical Society, Washington, DC, USA.

Criscuoli, et al., "An Economic Feasibility Study for Water Gas Shift Membrane Reactor", Journal of Membrane Science, 2001, vol. 181, pp. 21-27, Elsevier Science B.V., Amsterdam, The Netherlands.

Dolan, et al., Composition and operation of hydrogen-selective amorphous alloy membranes, Journal of Membrane Science, 2006, vol. 285, pp. 30-55.

Dorling, et al., "The Structure and Activity of Supported Metal Catalysts", Journal of Catalysis, 1971, vol. 20, pp. 190-201, Academic Press, London, UK.

Doyle, et al., "The Influence of intercystalline defects on hydrogen activity and transport in nickel", Acta Metallurgica et Materialia, 1995, vol. 43, No. 8, pp. 3027-3033.

Edlund, "A Membrane Reactor for H2S Decomposition", FETC 1996 Conference Proceedings: Advanced Coal-Fired Power Systems '96 Review Meeting, Morgantown, West Virginia, Jul. 16-18, 1996, pp. 1-9, U.S. Department of Energy, Office of Fossil Energy, USA.

Fisher, et al. "Solution of Hydrogen in Palladium/Copper Alloys", Journal of Solid State Chemistry, 1977, vol. 20, pp. 149-158, Academic Press Inc., Great Britain.

Flanagan, et al., "Solubility of Hydrogen (1 atm, 298 K) in Some Copper/Palladium Alloys", Solid State Communications, 1975, vol. 16, pp. 529-532, Pergamon Press, Great Britain.

(56) References Cited

OTHER PUBLICATIONS

Foley, et al."Effect of a Model Hydrogenation on a Catalytic Palladium Membrane", Selectivity in Catalysis, 1993, pp. 168-184, American Chemical Society—published by Oxford University Press, UK.

Foo "Chapter 4: Preparation and Characterization of a Composite Palladium-Gold Ceramic Membrane" and "Chapter 5: Conclusions and Recommendations", Hydrogen Separation in Palladium Ceramic Membranes and Palladium-Gold Ceramic Membranes, 1995, pp. 71-90, Colorado School of Mines, Golden, USA.

Gade, et al., "Fabrication of Unsupported Palladium-Alloy Dfilms by Electroless Plating", Prepr, Pap.-Am. Chem. Soc., Div. Fuel Chem. 2007, vol. 52, No. 2, pp. 661-662.

Gade, et al., "Unsupported palladium allow foil membranes fabricated by electroless plating", Journal of Membrane Science, 2008, vol. 316, pp. 112-118.

Grashoff, et al. "The Purification of Hydrogen—a Review of the Technology Emphasising the Current Status of Palladium Membrane Diffusion", Platinum Metals Review, 1982, pp. 157-169, Johnson Matthey PLC, London, UK.

Gryaznov et al., "Hydrogen Permeability of Some Metallopolymer Membranes", Polymer Science, 1993, vol. 35, No. 3, pp. 365-368, Russian Academy of Sciences, Moscow, Russia.

Gryaznov, et al. "Palladium-Ruthenium Alloys as Membrane Catalysts", Dokl. Akad. Nauk SSSR, Jul. 1973, pp. 604-606, Russian Academy of Sciences, Moscow, Russia.

Gryaznov, "Membrane Catalysis", Catalysis Today, 1999, vol. 51, pp. 391-395, Elsevier Science B.V., Amsterdam, The Netherlands.

Hollein, et al., "Preparation and characterization of palladium composite membranes for hydrogen removal in hydrocarbon dehydrogenation membranes reactors", Catalysis Today, 2001, vol. 67, pp. 33-42.

Hughes, et al., "A Comparative Study of Hydrogen Permeabilities and Solubilities in Some Palladium Solid Solution Alloys", Journal of Less-Common Metals, 1978, vol. 61, pp. P9-P21, Elsevier Sequois A.A., Lausanne, The Netherlands.

Hunter, "A New Hydrogen Purification Process", Platinum Metals Review, 1960, vol. 4, pp. 130-131, Johnson Matthey PLC, London, UK.

Jayaraman, et al., "Fabrication of Ultrathin Mettalic Membranes on Ceramic Supports by Sputter Deposition", Journal of Membrane Science, 1995, vol. 99, pp. 89-100, Elsevier Science B.V., Amsterdam, The Netherlands.

Kajiwara, et al.,"Hydrogen Permeation Properties Through Composite Membranes of Platinum Supported on Porous Alumina", Catalysis Today, 2000, vol. 56, pp. 65-73, Elsevier Science B.V., Amsterdam, The Netherlands.

Kajiwara, et al., "Stability and hydrogen permeation behavior of supported platinum membranes in presence of hydrogen sulfide", International Journal of Hydrogen Energy, 1999, vol. 24, p. 839-844.

Karavanov, et al.,"Hydrogenation of Acetylenic and Ethylenic Alcohols in the Liquid Phase on Membrane Catalysts Consisting of Binary Alloys of Palladium With Nickel and Ruthenium", Kinet. Catal., 1984, vol. 25, pp. 56-60, Plenum Publishing Corporation, New York, USA.

Karpova, et al., "Sorption of Hydrogen by Disperse Palladium-Copper Alloys", Russ. J. Phys. Chem., 1959, vol. 33, No. 6, pp. 1393-1400, Leningrad (English summary at end of article).

Keuler, et al., "Characterization of electroless plated palladium-silver alloy membranes", Thin Solid Films, 1999, vol. 347, pp. 91-98.

Keuler, et al., "Characterising Palladium-Silver and Palladium-Nickel Alloy Membranes Using SEM, XRD and PIXE", Nuclear Instruments and Methods in Physics Research, 1999, B 158, pp. 378-382, Elsevier Science B.V., Amsterdam, The Netherlands.

Keuler, et al., "Developing a heating procedure to optimise hydrogen permeance through Pd-Ag membranes of thickness less than 2.2μm", Journal of Membrane Science, 2002, vol. 195, pp. 203-213.

Kikuchi, et al., "Preparation of Supported Thin Palladium-Silver Alloy Membranes and Their Characteristics for Hydrogen Separation", Gas Separation & Purification, 1991, vol. 5, pp. 261-266, Butterworth-Heineman Ltd., USA.

Knapton, "Palladium Alloys for Hydrogen Diffusion Membranes", Platinum Metals Review, 1977, vol. 21, pp. 44-50, Johnson Matthey PLC, London, UK.

Koppel, et al., "A Fuel Cell Primer: The Promise and the Pitfalls", Sep. 15, 2000, Rev. 4, pp. 1-31.

Kulprathipanja, et al., Pd and Pd-Cu membranes: Inhibition of h2 permeation by H2S, Journal of Membrane Science, 2005, vol. 254, pp. 49-62.

Lemier, et al., "Grain boundary segregation, stress and stretch: Effects on hydrogen absorption in nanocrystalline palladium", Acta Materialia, 2007, vol. 55, pp. 1241-1254.

Lewis, The Palladium Hydrogen System, 1967, pp. 70-71, 78-79, 82-85, 116-117, and 144-145, Academic Press, London, UK.

Li, et al., "Preparation of Pd/Ceramic Composite Membrane 1. Improvement of the Conventional Preparation Technique", Journal of Membrane Science, 1996, vol. 110, pp. 257-260, Elsevier Science B.V., Amsterdam, The Netherlands.

Li, et al, The effect of carbon monoxide and steam on the hydrogen permeability of a Pd/stainless steel membrane, Journal of Membrane Science, 2000, vol. 165, pp. 135-141.

McCool, et al., "Composition Control and Hydrogen Permeation Characteristics of Suptter Deposited Palladium-Silver Membranes", Journal of Membrane Science, 1999, vol. 161, pp. 67-76, Elsevier Science B.B., The Netherlands.

Morreale, et al.,"The Permeability of Hydrogen in Bulk Palladium at Elevated Temperatures and Pressures", Journal of Membrane Science, 2003, vol. 212, pp. 87-97.

Nam, et al., "Hydrogen Separation by Pd Alloy Composite Membranes: Introduction of Diffusion Barrier", Journal of Membrane Science, 2001, vol. 192, pp. 177-185, Elsevier Science B.V., Amsterdam, The Netherlands.

Nam, et al.,"Preparation of a Palladium Alloy Composite Membrane Supported in a Porous Stainless Steel by Vacuum Electrodeposition," Journal of Membrane Science, Jan. 10, 1999, vol. 153, No. 2, pp. 163-173, Elsevier Science, B.V., United Kingdom.

Paglieri, et al.,"A New Preparation Technique for Pd/Alumina Membranes with Enhanced High-Temperature Stability", Industrial & Engineering Chemistry Research, 1999, vol. 38, No. 5, pp. 1925-1936, American Chemical Society, Washington, DC, USA.

Paglieri, "Chapter 6: Preparation of Palladiium-Copper Alloy Membranes for Hydrogen Separation" and "Chapter 7: Conclusions" and "Chapter 8: Recommendations for Future Work", Palladium and Palladium-Copper Composite Membranes for Hydrogen Separation, 1999, pp. 119-146, Colorado School of Mines, Golden, USA.

Paglieri, et al., "Innovations in palladium membrane research", Separations and Purification Methods, 2002, vol. 31, No. 1, pp. 1-169.

Di Pascasio, et al., "H2 plasma for hydrogen loading in Pd", Intermetallics, 2003, vol. 11, pp. 1345-1354.

Peachey, et al., "Composite Pd/Ta Metal Membranes for Hydrogen Separation", Journal of Membrane Science, 1996, vol. 111, pp. 123-133, Elsevier Science B.V., Amsterdam, The Netherlands.

Piper, "Diffusion of Hydrogen in Copper-Palladium Alloys", Journal of Applied Physics, 1966, vol. 37, No. 2, pp. 715-721, American Institute of Physics, New York, USA.

Roa, et al., "The Influence of Alloy Composition on the H2 Flux of Composite Pd-Cu Membranes", Desalination, 2002, vol. 147, pp. 411-416, Elsevier Science B.V., Amsterdam, The Netherlands.

Rodina, et al., "The Interaction of Hydrogen with Certain Palladium—Gold and Palladium—Silver—Gold Alloys", Russian Journal of Physical Chemistry, 1971, vol. 45, No. 5, pp. 621-623.

Rodman et al. "Studies of the oxidation of palladium complexes by the advanced oxidation process pretreatment of model catalysts for precious metal analysis," Talanta, Sep. 15, 2006, vol. 70, No. 2, pp. 426-431.

Roy, et al., "Economics and Simulation of Fluidized Bed Membrane Reforming", International Journal of Hydrogen Energy, 1998, vol. 23, No. 9, pp. 745-752, Elsevier Science Ltd., Great Britain.

Saracco, et al., "High-Temperature Membrane Reactors: Potential and Problems", Chemical Engineering Science, 1999, vol. 54, pp. 1997-2017, Elsevier Science Ltd., Oxford, UK.

(56) References Cited

OTHER PUBLICATIONS

Shu, et al., "Simultaneous Deposition of Pd and Ag on Porous Stainless Steel by Electroless Plating", Journal of Membrane Science, 1993, vol. 77, pp. 181-195, Elsevier Science Publishers B.V., Amsterdam, The Netherlands.

Subramanian, et al., "Cu-Pd (Copper-Palladium)", Binary Alloy Phase Diagrams, 1990, vols. 1-3, pp. 947-948, ASM International, USA.

Thomas, et al., "Fuel Cells—Green Power", 1999, pp. 1-33, Los Alamos National Laboratory, Los Alamos, USA.

Uemiya, et al., "Hydrogen Permable Palladium-Silver Alloy Membrane Supported on Porous Ceramics", Journal of Membrane Science, Mar. 1991, vol. 56, pp. 315-325, Elsevier Science Publishers B.V, Amsterdam, The Netherlands.

Uemiya, et al., "Separation of Hydrogen Through Palladium Thin Film Supported on a Porous Glass Tub", Journal of Membrane Science, 1991, vol. 56, pp. 303-313, Elsevier Science Publishers B.V., Amsterdam, The Netherlands.

Uemiya, "State-of-the-Art of Supported Metal Membranes for Gas Separation", Separation and Purification Methods, 1999, vol. 28, No. 1, pp. 51-85, Marcel Dekker, Inc., New York, USA.

Van Swaay, et al., "Permeability and Diffusion on Hydrogen Through Palladium", Transactions of the Metallurgical Society of AIME, Apr. 1960, vol. 218, pp. 285-289, The Metallurgical Society of AIME, USA.

Wu, et al., "Preparation of a Palladium Composite Membrane by an Inproved Electroless Plating Technique", Industrial & Engineering Chemistry Research, 2000, vol. 39, pp. 342-348, American Chemical Society, Washington, DC, USA.

Xomeritakis, et al., "Fabrication of Thin Metallic Membranes by MOCVD and Sputtering", Journal of Membrane Science, 1997, vol. 133, pp. 217-230, Elsevier Science B.V., Amsterdam, The Netherlands.

Yeung, et al., "Novel Preparation of Pd/Vycor Composite Membranes", Catalysis Today, 1995, pp. 231-236, 25, Elsevier Science B.V., Amsterdam, The Netherlands.

Yeung, et al., "Novel Preparation Techniques for Thin Metal-Ceramic Composite membranes", AIChE Journal, Sep. 1995, vol. 41, No. 9, pp. 2131-2139, American Institute of Chemical Engineers, New York, USA.

Zetkin, et al., "Diffusion and Penetrability of Deuterium in the Alloy Pd-53 at % Cu", Sov. Phys. Solid State, 1992, vol. 34, No. 1, pp. 83-85, American Institute of Physics, New York, USA.

Zetkin, et al., "Influence of Structural Transformations on the Diffusion Parameters of Deuterium in Palladium-Copper Alloys", Phys. Met. Metall., 1987, vol. 64, No. 5, pp. 130-134, Pergamon Press PLC, Poland.

Zhang, et al., "High Temperature PEM Fuel Cells", Journal of Power Sources, 2006, vol. 160, pp. 872-891.

Zhao, et al., "Preparation and characterization of palladium-based composite membranes by electroless plating and magnetron sputtering", Catalysis Today, 2000, vol. 56, pp. 89-96.

Zhao et al. "Preparation of palladium composite membranes by modified electroless plating procedure," Journal of Membrane Science, May 13, 1998, vol. 142, No. 2, pp. 147-157.

\* cited by examiner

MULTILAYER SULFUR-RESISTANT COMPOSITE METAL MEMBRANES AND METHODS OF MAKING AND REPAIRING THE SAME

GOVERNMENT INTEREST

This invention was made with government support under grant number FG36-05GO15093 awarded by the Department of Energy (DOE). The Government has certain rights in the invention.

CROSS REFERENCE TO RELATED APPLICATION

This application claims priority under 35 U.S.C. §119(e) to U.S. Provisional Patent Application Ser. No. 61/365,114 filed Jul. 16, 2010, which is incorporated herein in its entirety by reference.

FIELD OF THE INVENTION

The invention relates to thin, hydrogen-permeable, sulfur-resistant membranes formed from multi-layers of palladium or palladium-alloy coatings on porous, ceramic or metal supports, methods of making these membranes, methods of repairing layers of these membranes and devices that incorporate these membranes.

BACKGROUND OF THE INVENTION

Inexpensive sources of purified hydrogen are sought after for many industrial chemical production processes and in the production of energy in fuel cell power systems. Similarly, inexpensive methods of purifying hydrogen could significantly expand the applicability of hydrocarbon reforming, reforming reactors and the water gas shift reaction. Other applications are high temperature hydrogen separations, fuel cell power systems, hydrogen fueling stations, hydrocarbon reforming, and use in membrane reactors, devices that can simultaneously form a product and separate the reaction products.

Palladium and its alloys, as well as nickel, platinum and the metals in Groups III-V of the Periodic Table are all permeable to hydrogen. Hydrogen-permeable metal membranes made of palladium and its alloys are the most widely studied due to their high hydrogen permeability, their chemical compatibility with many carbon containing gas streams, and their theoretically infinite hydrogen selectivity. Hydrogen molecules ($H_2$) present in steam of mixed gas molecules will dissociate into hydrogen atoms, which dissolve into the palladium and diffuse across a palladium metal barrier to recombine into hydrogen molecules and dissociate from the opposite surface of the palladium barrier as a purified hydrogen gas. Thus, a gas stream formed in different industrial processes that contains many different molecular components including hydrogen can be directed to a palladium membrane to selectively recover the hydrogen present in the gas, thereby producing a purified hydrogen gas stream without significant additional energy input.

Unfortunately, pure palladium membranes are themselves expensive when used in such purification processes due to their rapid degeneration and limited life. Atomic hydrogen is so soluble in palladium that it forms a separate hydride phase ($\beta$), which has a much larger lattice constant, causing swelling, warping and cracking of the palladium membrane. This $\alpha \leftrightarrow \beta$ phase transition takes place at the critical temperature of 295° C., making it difficult to avoid premature breakdown during prolonged industrial use. Additionally, sources of sulfur, present in many industrial process gasses, produce hydrogen sulfide when they contact palladium membranes at high temperature. Hydrogen sulfide is a potent poison of the hydrogen dissociation catalysts including palladium metal membranes, and exposure to sulfur-bearing gasses rapidly lowers the permeability of a palladium membrane to hydrogen requiring the replacement of the relatively expensive membrane structure.

In an attempt to overcome these problems with pure palladium membranes, alloys of palladium have been tested that display a comparable hydrogen permeability with superior physical strength and greater resistance to thermal degradation and sulfur poisoning. As early as 1963, McKinley (U.S. Pat. No. 3,350,845) formulated alloys of palladium with copper, silver and gold and showed that palladium-gold alloys containing about 55 weight percent gold had improved resistance to poisoning by sulfur-containing gases, albeit with about a 10-fold decrease in hydrogen permeability. Alternatively, palladium-silver membranes and palladium-copper membranes containing about 10 weight percent silver and about 40 weight percent copper, respectively, showed an increased permeability to hydrogen but were equally or more sensitive to sulfur poisoning compared to pure palladium membranes.

The palladium-gold membranes disclosed by Mckinley were relatively thick and prepared by conventional metallurgy techniques. Such membranes are still prohibitively expensive for most industrial applications. Therefore, there has been a long-felt need for a fabrication method capable of inexpensively and efficiently producing palladium alloy membranes having high thermal stability, durability and resistance to sulfide poisoning.

Recent research efforts have focused on the development of composite metal membranes consisting of a relatively thin Pd or Pd-alloy coatings on hydrogen permeable base metals, or on porous ceramic or stainless steel supports.

Many palladium alloys such as $Pd_{73}Ag_{27}$, $Pd_{95}Au_5$, and $Pd_{60}Cu_{40}$ possess higher hydrogen permeability than pure palladium. In the 1969, McKinley and co-workers (U.S. Pat. No. 3,439,474) reported that binary alloys of Pd with Au and Cu had pure hydrogen permeabilities greater than Pd and PdAg, were unaffected by thermal cycling, and had some resistance to sulfur poisoning by hydrogen sulfide. The inhibition or reduction of the pure hydrogen flux due to exposure to 4 ppm hydrogen sulfide through the 40 mass percent Au alloy was the least compared to pure Pd, PdAg and PdCu alloys.

The sulfur resistance of PdCu foil membranes was investigated by researchers at the DOE NETL laboratory (B. D. Morreale, B. D, et al., *J. Membr. Sci.*, 241:219 (2004)). They reported the best sulfur resistance with a 20% Cu in Pd binary alloy having an FCC crystal structure. But this $Pd_{80}Cu_{20}$ alloy has only 20% of the hydrogen permeability of pure Pd and about 2 times less than 40% Au.

Further relating to unsupported Pd or Pd alloy foil membranes, U.S. Pat. No. 6,152,995 describes a process to increase the flux of hydrogen through a metal foil membrane by chemical etching using a mineral acid such as $HNO_3$ or mixtures of $HNO_3$ and HCl. This patent also describes methods for finding leaks on metal foil membranes and techniques to repair such leaks.

Thus, there is still a need for sulfur resistant, composite metal membranes and improved methods of designing and making these membranes. There is also a need for a repair technique for the Pd or Pd alloy supported membranes.

SUMMARY OF THE INVENTION

The present invention provides methods of fabricating a sulfur-resistant composite metal membranes including seeding a substrate with palladium crystallites, decomposing any organic ligands present on the substrate, reducing the palladium crystallites on the substrate to the metallic form, depositing a film of palladium metal on the substrate, repairing the palladium metal, and depositing a second alloying film on the palladium film. A multilayer film of Pd and the alloying metal is created by adding additional layers of palladium and/or the alloying metal. This multilayer film is then dried at a temperature between about 130° C. and about 275° C. to form a sulfur-resistant, composite multilayered Pd-metal alloy membrane. A Pd-metal alloy multilayer film formed by this method preferably have total thickness of at least about 3 μm and the substrate is preferably a stainless steel support having a porous $ZrO_2$ coating that may optionally be sealed so as to render one or more portions of the substrate impermeable to hydrogen gas.

The substrate may be seeded by airbrushing a palladium salt solution onto the surface of the substrate. Preferably, a palladium salt solution containing palladium (II) acetate and chloroform is used for this technique.

The substrate in one embodiment may be fired to eliminate any organic ligands present. The substrate may also be reduced by immersion in a reducing solution such as a solution containing water, $NH_3OH$ and hydrazine.

The first film of palladium metal is deposited on the substrate by electroless plating. In one embodiment, a palladium plating bath solution is pumped over the surface of the substrate, preferably until a palladium layer having a thickness of between about 0.7 μm and about 1.5 μm is formed. The palladium plating bath may be a solution containing water, $NH_3OH$, HCl, Palladium (II) chloride and hydrazine. Similarly, the deposition of a second film of an alloying material, preferably gold, is performed by pumping a gold plating bath, such as a solution containing water, NaOH and gold (III) chloride, over the surface of the substrate. This is continued until a gold layer having a preferred thickness of between about 0.2 μm and about 0.4 μm is formed on the palladium layer.

The invention in one embodiment also provides a method for repairing the metal layers, which is particularly applicable to the palladium layers of the coating. Following the palladium plating, the lumen of the membrane is filled with reducing solution and sealed. The membrane is put into the palladium plating bath. This process reduces holes on and in the palladium metal film layer of the coating.

Further metal layers of palladium, gold or other metals, such as silver, may be formed on the second, gold layer. Alternatively, palladium and silver layers or palladium and ruthenium layers may be co-deposited on the substrate, followed by a layer of a metal alloy, preferably gold. Alternatively, the layers may be applied to the surface of the substrate by electroless plating. The layers may be applied sequentially, though this is not required. Furthermore, multiple metals may be applied to the activated surface, preferably palladium and ruthenium and gold.

The invention in another embodiment also provides a sulfur-resistant PdAu composite membranes made by seeding a substrate with palladium crystallites, optionally decomposing any organic ligands present on the substrate, reducing the palladium crystallites to the metallic form, depositing a first film of palladium metal on the substrate, repairing the first film layer of palladium metal on the substrate, depositing a second film of gold on the palladium film, adding additional layers of palladium, followed by the repair of the palladium film layer, adding additional layers of gold and repeating the addition of the added layers, and repair, until the desired thickness of the multilayered film is obtained. The metal multilayer film may be dried or annealed.

In the deposition of the metal membranes on the substrate during the fabrication methods of the present invention, the depositing steps are preferably conducted in the absence of both organic complexing agents, such as EDTA, and tin.

The invention also provides hydrogen-permeable and sulfur poisoning-resistant composite membranes. These composite membranes are composed of a porous substrate having a PdAu alloy layer on at least one surface. The PdAu alloy preferably has a mass percent Au between 5 and 50 mass percent and wherein the PdAu alloy is non-homogenous.

DETAILED DESCRIPTION OF THE INVENTION

Figure 1:
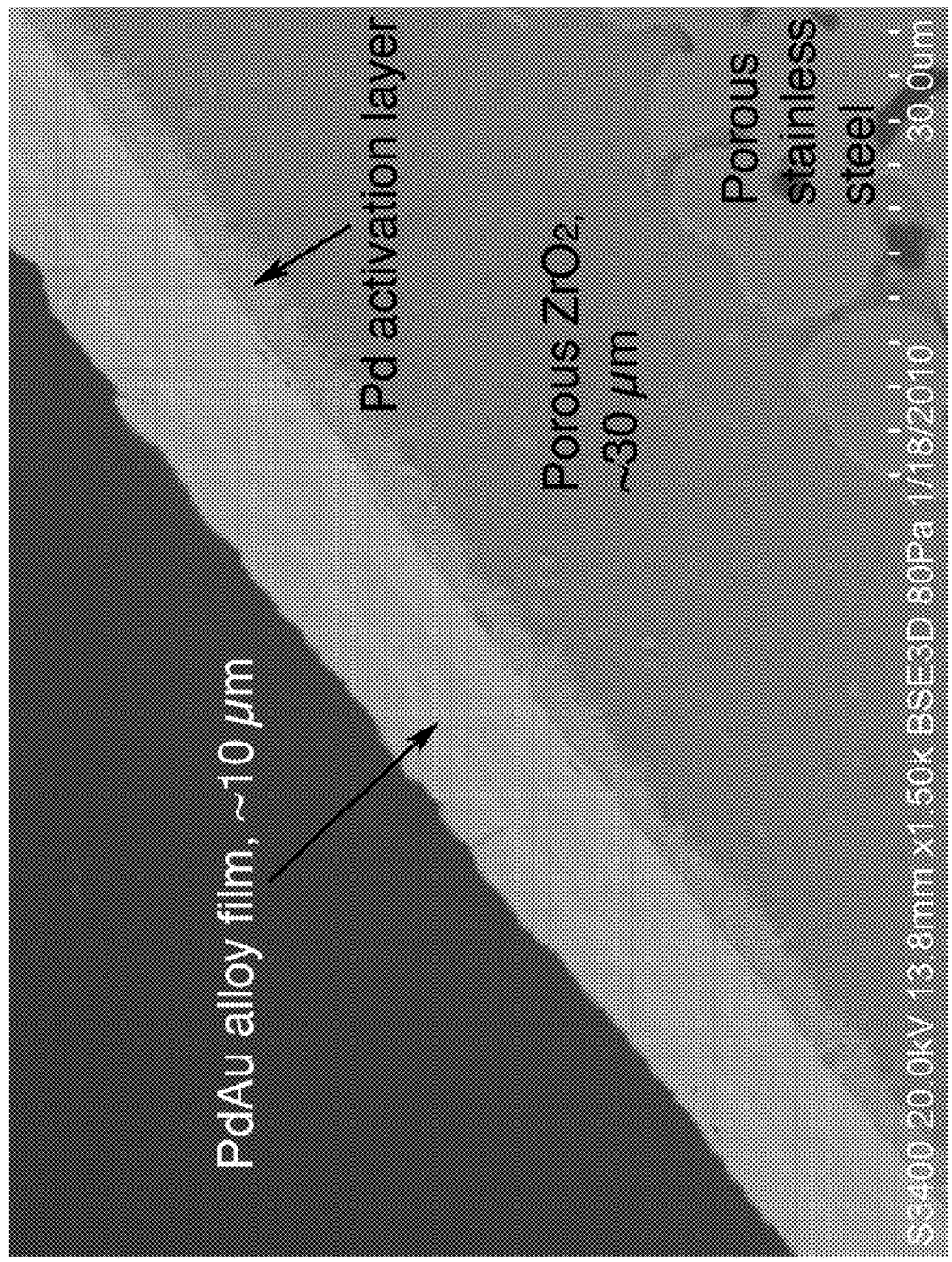
FIG. 1 is a SEM cross section of a layered membrane. The five Pd plating cycles with the interstitial Au and repair cycles can be distinguished.

The present invention provides metal alloy membranes having high hydrogen permeability and good resistance to sulphide poisoning. The invention also provides optimal methods to fabricate sulfur resistant, high flux composite membranes that can be applied to high temperature hydrogen separations. The invention also provides added support for the membranes to increase the durability of the membranes.

One aspect of the invention provides composite membranes composed of a multilayered palladium alloy film supported on a substrate that display higher $H_2$ flux from a multicomponent gas mixture containing hydrogen sulfide and other sulphurous constituents than the $H_2$ flux for previously reported palladium alloy composite membranes. These membranes are formed on porous supports by electroless plating methods.

The composite membranes include a thin multilayered palladium alloy layer on a porous substrate. The porous substrate may be any porous, inorganic support including oxide ceramics (e.g., alumina, titania and zirconia), non-oxide ceramics (e.g., SiC and SiN), sintered or porous metals (e.g., stainless steel and nickel), sintered or porous metals with ceramic surfaces, and porous vycor glass. The substrate may be either tubular or planar or any geometry such that the surfaces that bear the Pd alloy film are adequately exposed.

A permeable diffusion barrier separating the substrate from the Pd alloy film is desirable. For example, a stainless steel support coated with porous $ZrO_2$ having a pore diameter of about 80 nm has been extensively tested and shown to work well.

Substrates that are symmetric or asymmetric, have pores of different sizes, or have a gradient of pore sizes, may be used. While symmetric substrates are typically less expensive, asymmetric substrates have a lower resistance to flow and therefore minimize the pressure drop experienced in the support. Thus, given a similar thickness of Pd alloy deposited on the substrate, greater fluxes can be achieved with an asymmetric support. A small pore size in the substrate is needed to minimize surface roughness and therefore the corresponding Pd film thickness. Alternatively, at pore sizes of about 5 nm in diameter or less, the adhesion of the film to the substrate is reduced. Good results have been obtained with asymmetric substrates with a pore size gradient that extends over an about 20-200 nm diameter pore size range.

Certain surfaces of the substrate may be sealed as desired to prevent $H_2$ from flowing through those regions of the membrane. Typically, a low temperature glaze (e.g., potter's glaze) is utilized as the sealant because many substrates are subject to damage if exposed to high temperatures.

The hydrogen flux through these Pd alloy membranes is inversely proportional to the thickness of the membrane and therefore, thinner Pd alloy membranes are more desirable for their increased rate of hydrogen flux and lower cost for the palladium and alloy metal components. The hydrogen flux is also dependent upon the number and size of holes within the Pd alloy membranes. When a support with small pores is used, a thinner film may be used and still produce a leak-free membrane, because it is easier to cap small pores by plugging them with metal. Very thin, defect-free Pd alloy membranes however, are difficult to form and the inherent defects lead to losses in selective permeability of the membrane to hydrogen and more rapid physical deterioration of the membrane, requiring more frequent membrane replacement. Thin metal films are sufficient to prevent leaking at low temperatures, but when heated, the metal crystallites may rearrange, opening slightly covered pores in the ceramic support, leading to the formation of pores or outright rupture of the palladium alloy membrane and loss of selective hydrogen permeability. Pd alloy membranes having a thickness in the range of between about 1 micron and about 10 micron are preferred as striking a balance between good hydrogen diffusion rates, relatively easy defect-free production and physical durability. Pd alloy membranes having a thickness in the range of between about 2 microns and 5 microns are the most preferred.

The weight percent content of the palladium alloy is formulated to maximize hydrogen permeability while achieving resistance to sulfur poisoning and physical durability. With PdCu alloys, the hydrogen permeability increases through a maximum around 40 wt. % Cu ($Pd_{60}Cu_{40}$). This high percentage of Cu significantly reduces membrane cost relative to pure Pd, and the $Pd_{60}Cu_{40}$ alloy exhibits increased resistance to hydrogen sulfide poisoning. Further, a $Pd_{60}Cu_{40}$ membrane can withstand repeated temperature cycling with less distortion than pure Pd because at about 40 wt. % Cu, the critical temperature for β-hydride phase formation is below room temperature. Similarly, $Pd_{77}Ag_{23}$ has a higher hydrogen permeability than pure palladium membranes. Surprisingly, and in contrast to the PdAu membranes disclosed by Mckinley (U.S. Pat. No. 3,350,845), PdAu membranes having a lower weight percent Au in the range of $Pd_{95}Au_5$ to $Pd_{55}Au_{45}$ have a higher hydrogen flux than pure palladium and a much greater resistance to sulfide poisoning than comparable PdCu or PdAg membranes. For example, an approximately 5 micrometer $Pd_{85}Au_{15}$ membrane shows only about a 38% drop in hydrogen flux in the presence of about 5 ppm $H_2S$ compared to an about 71% drop for a comparable $Pd_{94}Cu_6$ and the $Pd_{85}Au_{15}$ membrane had a higher hydrogen flux in the presence of $H_2S$ than the $Pd_{94}Cu_6$ membrane in the absence of $H_2S$. A $Pd_{80}Au_{20}$ membrane having a thickness of about 2.5 microns and formed on a stainless steel substrate with a $ZrO_2$ coating has a hydrogen permeability approaching that of pure palladium and a hydrogen/nitrogen separation factor of greater than the ideal value of about 400 when tested at about 400° C. Similarly, a $Pd_{95}Au_5$ membrane having a thickness of about 3 microns and formed on a stainless steel substrate with a $ZrO_2$ coating had a hydrogen permeability approaching that of pure palladium and a hydrogen/nitrogen separation factor of greater than about 10,000 when tested at about 400° C. A $Pd_{90}Au_{10}$ membrane formed on a stainless steel substrate with a $ZrO_2$ coating exposed to a water gas shift gas mixture (about 51% $H_2$, about 26% $CO_2$, about 21% $H_2O$, about 2% CO) at about 400° C. operated at an about 76% $H_2$ recovery which is nearly the same as the hydrogen flux seen with exposure to a pure gas flux having a similar $H_2$ partial pressure, indicating a hydrogen selectivity with only minor reductions in the presence of a mixed molecular gas feed stream.

One aspect of the invention provides a method of making these multilayer alloy and pure palladium composite membranes. Both planar and tubular Pd/Au membranes can be fabricated using the improved, sequential, electroless plating processes described here. In a preferred embodiment, tubular membranes are formed on stainless steel supports. The membranes are deposited onto $ZrO_2$/stainless steel substrates by a sequential electroless plating process. Although other deposition methods may be used, electroless plating offers advantages over other deposition techniques because it can deposit uniform films on complex shapes and large substrate areas with sufficient hardness, using simple equipment. PdAu alloy membranes are fabricated by sequential plating of first Pd and then Au. The target thickness for the PdAu alloy films is between about 2 μm and about 5 μm to maximize the hydrogen permeance.

This method advantageously eliminates tin (Sn) and carbon impurities in the Pd films, which can cause structural instability, particularly at high temperature, and reduced $H_2/N_2$ separation ratio (pure gas permeability ratio). These methods are particularly suited for alloy compositions with about 5-50 mass % Au, which the present inventors have shown to have the highest permeability and best resistance to sulfur. Importantly, no organic complexing agent, such as EDTA, is used in the Pd plating solution to minimize contamination by carbon. When pure gases are used, they are preferably nominally about 99.999% pure (UHP grade). The process includes depositing a layer of Pd, repairing the layer of Pd, depositing a layer of an alloying metal, such as Ag, Ru, Au or Cu, using electroless plating, repeating the steps of depositing layers of Pd, repairing the Pd and depositing a layer of the allowing metal, followed by a low temperature drying step. The drying step forms the Pd-metal alloy at a much lower temperature than traditional annealing.

Initially, a substrate is provided. If needed, the provided substrate is subjected to a pre-processing step in which the substrate is subjected to one or more operations that are needed to place the substrate in condition for plating related operations and/or one or more operations that are more readily accomplished prior to plating related operations. If the substrate that is provided is not clean or becomes dirty before a plating operation, the substrate must be cleaned to remove any salts or other materials that could interfere with the subsequent plating processes. Typically, cleaning is carried out with isopropanol and deionized water but other cleaning procedures that remove the undesirable material or materials are also feasible. Further, if the substrate that is provided does not have the appropriate dimensions, appropriate sizing operations are undertaken. Typically, this involves cutting the substrate but other form- or shape-altering methods are also feasible. It is also feasible to perform sizing operations at different points in the composite membrane production process.

In these substrate preparation processes, the surfaces of the substrate may be sealed in places where it is undesirable to have $H_2$ flow in the finished membrane. Typically, a low temperature glaze (e.g., potter's glaze) is utilized because many substrates are subject to damage if exposed to high temperatures. For example, if the U.S. Filter T1-70 5 nm filter, an asymmetric ceramic filter, is exposed to temperatures above about 600° C., the thin top layer of the filter is subject to damage. Certain substrates do not require sealant to be used. For example, some metallic supports may have dense metal tubes welded to each end. Regardless of the sealant utilized, the sealant applied in any suitable manner, including but not limited to, painting the sealant onto the surface to be sealed or the surface is dipped in sealant. Other application methods, such as spraying, are also feasible. In a preferred embodiment, the ends of a tubular substrate are each dipped into the sealant. Preferably, the sealant is applied prior to the alloy film being applied. With the ends sealed and assuming that the Pd alloy film is applied to the outer wall of the substrate, $H_2$ and other materials that are in a stream that is passing through the tubular substrate are constrained to traveling through the inner wall of the substrate to the outer wall of the substrate, and then through the Pd alloy film on the outer wall of the substrate to the appropriate collection on the outside of the tubular composite membrane. Because of the sealant, the $H_2$ and other materials are prevented from exiting the substrate via the end walls. It is also feasible to perform sealing operations at a different point in the production process. For instance, in the case of a metal substrate, sealing by brazing, silver soldering or welding are feasible at any point in the production process.

After pre-processing of the substrate, the surface of the substrate where the Pd alloy film is to be deposited is "seeded" with Pd crystallites to catalyze the rate of film growth (i.e. heterogeneous nucleation as opposed to homogenous nucleation) on the substrate and achieve good adhesion of the palladium "seeds" to the substrate by employing palladium seeds that are smaller than the grains on the surface of the substrate that is being plated. This process can be performed using a variety of methods including impregnation with an organic solution of Pd acetate. In a preferred embodiment, the membrane supports are seeded with palladium nanocrystallites by airbrushing a solution of palladium salt onto the surface of the chosen support. In the case of a metal substrate, the seeding of the surface with Pd crystallites may be accomplished using an organic Pd solution in which the solvent is a light, polar, organic solvent, such as tetrahydrofuran (THF), ethyl acetate, acetonitrile, diethyl ether, methyl ethyl ketone (MEK), or acetone. Preferably, the solvent is chloroform. The composition of a preferred solution or "activation bath" for seeding substrates with palladium nanocrystals is shown in Table 1. All quantities are approximate values.

TABLE 1

| Component | Quantity |
| --- | --- |
| Palladium (II) Acetate, about 99% pure | 3.3 grams |
| Chloroform, HPLC grade | 100 mL |

The membrane is then fired in air in order to decompose any organic ligand present. Air firing at about 350° C. for about 5 hours is typically sufficient to eliminate the acetate ligand present in the activation bath of Table 1, but one of skill in the art will readily recognize that variations on this time and temperature can be made while still accomplishing the decomposition of organic ligands. The activation process may be performed more than once and is preferably performed twice.

Prior to any plating process, the activated membrane is reduced in order to convert the palladium crystallites to the metallic form. This may be accomplished by immersion in a dilute hydrazine solution for about 20 minutes at about 50° C., but it will be readily recognized that variations on this reduction process are possible while still accomplishing the reduction of the crystallites to the metal form. A preferred hydrazine solution used in reducing the palladium crystallites is provided in Table 2. All quantities are approximate values.

TABLE 2

| Component | Quantity |
| --- | --- |
| Deionized $H_2O$ | 650 mL/L |
| About 28-30 wt % $NH_3OH$ | 340 mL/L |
| Hydrazine (1M) | 10 mL/L |

After the portion of the surface that is to bear the Pd alloy film has been seeded, a Pd film is deposited on the seeded surface. Electroless plating systems, such as non-flowing plating, batch plating and vacuum pump plating, may be used to deposit the Pd film. In an embodiment, the Pd film is deposited using a flow system with an osmotic pressure gradient. In another embodiment, a plating bath is prepared containing palladium chloride and the bath is pumped over the surface of the activated and reduced membrane. A preferred palladium plating bath composition is provided in Table 3. All quantities are approximate values.

TABLE 3

| Component | Quantity |
| --- | --- |
| Deionized $H_2O$ | 602 mL/L |
| 28-30 wt % $NH_3OH$ | 392 mL/L |
| 37 wt % HCl | 6 mL/L |
| Palladium (II) Chloride, 99% pure | 5.5 g/L |

1 M hydrazine is added to the plating bath shown in Table 3 immediately prior to plating, with a volume ratio of 100 parts plating bath to 1 part hydrazine. The ratio of the volume of Pd plating solution to the area to be plated ranges from about 3 $cm^3/cm^2$ to about 5 $cm^3/cm^2$. The bath is then heated to about 50° C. and pumped over the surface of the activated and reduced membrane. The plating cycle continues for a time sufficient to produce the desired thickness of the palladium film. The deposited film is typically in the range of about 0.5 μm to about 7 μm thick. A typical plating cycle lasts about 20 minutes to produce a Pd layer having a thickness of about 1 μm and preferably, a Pd layer between about 0.7 μm to about 1.5 μm thick.

Another aspect of the present invention is the repair of each film layer. Following each application of the metal film, the film layer is repaired by sealing the lumen of the membrane with reducing solution then immersing the membrane into a standard plating solution. The membrane is soaked for between about 4 hours and about 16 hours at approximately 50° C. then removed from the solution. The membrane may be rinsed in DI water and dried. This repair technique is especially useful for use with palladium repair, though it may be used for any metal that oxidizes during the application of the multilayer film. This technique may also be repeated following any and all plating steps or only following selected plating steps. When this technique is used for Pd repair, there is no detectable increase in the Pd mass, however it effectively decreases the flux measurements using nitrogen following the repair technique while keeping the hydrogen flux unchanged. Following the repair step, the hydrazine may be recycled and reused or disposed.

A first alloying metal to be alloyed with the palladium layer is then plated on the palladium-plated substrate. This metal(s) may also be applied by electroless plating. The metal may be any metal capable of alloying with palladium, including but not limited to gold, silver, copper, and ruthenium. In a preferred embodiment, the first alloying metal is gold. The electroless plating may be conducted in the same manner as the plating of the palladium plating operation. In the case of gold plating, a preferred gold plating bath is provided in Table 4. All quantities are approximate values.

TABLE 4

| Component | Quantity |
| --- | --- |
| Gold (III) Chloride, 99% pure | 1 g/L |
| 50 wt % Sodium Hydroxide | 20 mL/L |
| Deionized H$_2$O | 980 mL/L |

In one embodiment, gold plating is performed by flowing the gold plating bath on the film (activated) side of the membrane, while the reducing bath from Table 2 is simultaneously flowed on the support side of the membrane. This is done at 50° C. and plating continues until a uniform film of gold of a desired thickness is formed on the palladium membrane surface. The first alloying metal layer should be between about 0.1 μm to 0.4 μm thick. Preferably, each first alloying material layer is between about 0.2 μm thick and about 0.3 μm thick.

In one embodiment, the multiple layers of the first alloying metal and palladium are not alternating. In the preferred embodiment, alternate multiple layers of palladium and the first alloying metal layers are applied to the surface of the substrate. Following the first alloying metal plating, a palladium layer is plated on first alloying metal layer using the electroless plating operation described above thus yielding a palladium—the first alloying metal—palladium layered membrane film. The repair technique may also be repeated after each application of either the first alloying layer or the palladium layer, however, in the preferred embodiment, the repair is repeated following each application of a palladium layer. The process of applying a palladium film, followed by the palladium repair, followed by the first alloying metal plating is repeated until a multilayer film has been applied to the substrate. The multilayer film contains at least three total layers and preferably ten total layers of Pd-first alloying metal and even more preferably a total of between three to seven layers of each material is preferred. Though the total thickness will vary depending upon the number of layers used, it is preferred that the total thickness be between about 3 to about 10 microns. An SEM image of a five layer, ~10 micron multilayer film is illustrated in FIG. 1.

In another embodiment, the multilayer film is made and no repair step is performed. In another embodiment, the repair is performed only during select stages, for example, after a Pd layer is added to the multilayer film.

Because a multilayer film is used, an annealing step is not required to form the palladium alloy. Rather, following the application of the multilayered film, the membranes are dried at approximately 130° C. for approximately 5 hours. The drying step may take place at the conclusion of the application of the multilayer films, or may occur intermittently during the film application process. In a preferred embodiment, the membranes are heated at a rate of approximately 60° C./hour. In some embodiments, the membranes are also cooled at a controlled rate, however, the cooling rate may be controlled by the cooling rate of the environment.

In another embodiment, the multilayered palladium alloy film is reduced using the repair step described above. In a further embodiment, additional layers of film are applied to the repaired multilayered film as described above, followed by an additional drying step as described above.

This multilayer film is more beneficial than a binary layer of palladium and gold because it increases the hydrogen flux measurements through the membrane without a sufficient increase in the amount of palladium used on the membrane. It is believed that the repair step may clean the plated material, which can be plated in a subsequent step to fill the holes. The multilayer films are also beneficial over a binary film layer. The multilayer film is believed to be beneficial because any defects that may exist in each film layer would likely not overlap leading to greater durability in mixed gas streams. Additionally, the palladium alloy forms at a much lower temperature than required by a binary layer of palladium and gold.

In still another embodiment, the multilayered system is created using palladium and at least two additional alloying materials. For example, a multilayer film is created using palladium, the first alloying metal and a second alloying metal.

In one embodiment, palladium is applied to a substrate using an electroless plating process described above. The palladium layer is repaired using the repair step disclosed above. A first alloying metal layer is applied to the palladium layer as described above. Then, rather than adding another layer of palladium, a second alloying metal, including silver, gold, copper or ruthenium, is applied using an electroless plating process. The thickness of the second alloying metal layer should be between about 0.1 μm to 0.5 μm thick. Preferably, each second alloying material layer is between about 0.2 μm thick and about 0.3 μm thick. Additional layers of the palladium, the first alloying material and the second alloying material are added to create a multilayer film on the substrate. Though the film is preferably arranged such that each layer is alternating between the palladium, the first alloying material and the second alloying material, this is not necessary. Additionally, an equal number of each film layer need not be used. Furthermore, the repair step described above may occur after each layer is applied, after certain layers are applied or after just the palladium layers are applied.

In one embodiment, the alloying metal (either first or second) is silver. The silver layer is also added using any of the electroless plating methods noted above. A preferred silver plating bath is described in Table 5. All quantities are approximate values.

TABLE 5

| Component | Quantity |
| --- | --- |
| Silver Nitrate, 99.9% pure | 0.31 g/L |
| 28-30 wt % NH$_3$OH | 780 mL/L |
| Deionized H$_2$O | 220 mL/L |

In an embodiment, the silver plating bath of Table 5 is used and 0.3 M hydrazine is added to the plating bath immediately prior to plating, in a volume ratio of 50 parts plating bath to 1 part hydrazine. The bath is then heated to about 40° C. and flowed over the surface of the activated and reduced membrane. This plating cycle is conducted for a time sufficient to produce a sufficiently-thick silver layer and typically lasts about 30 minutes.

In an alternative embodiment, the silver plating bath provided in Table 6 may also be used. All quantities are approximate values.

TABLE 6

| Component | Quantity |
| --- | --- |
| Silver Nitrate, 99.9% pure | 0.26 g/L |
| Tetraaminepalladium chloride, 99.9% pure | 1.37 g/L |
| 28-30 wt % $NH_3OH$ | 372 mL/L |
| Deionized $H_2O$ | 628 mL/L |
| Hydrazine (1M) | 3.33 mL/L |

In this embodiment an appropriately activated substrate is used and the plating temperature is typically about 40° C.

In another embodiment, palladium and ruthenium are applied to the activated substrate in a single step from a single plating solution. Approximately 0.3 g $RuCl_3$ was dissolved in about 19 mL $H_2O$ and about 1 mL approximately 37 wt % HCl and sonicated for about 5 min. Approximately 80 ml standard Pd plating solution and approximately 1 mL hydrazine solution was added to finalize the plating bath. The membrane was plated for approximately 20 min at approximately 55° C. Any suitable bath parameter for ruthenium may be used. For example, see Gade, S. K., Keeling, M. K., Davidson, A. P. Hatlevik, Ø., and J. D. Way, "Palladium-ruthenium membranes for hydrogen separation fabricated by electroless co-deposition," International Journal of Hydrogen Energy, 34, 6484-6491 (2009), Table 1, describing the fabrication of PdRu membranes by electroless codeposition, which is incorporated by reference. Following the application of the palladium-ruthenium layer, the repair step may be performed on the membrane. An additional layer of an alloying material may be layered with the palladium-ruthenium layer using the method described above. In a preferred embodiment, the alloying material is gold. Because ruthenium adds strength to the film, the amount of alloying material added to the multilayered system is less than if ruthenium is not used. Thus, at least one layer of palladium-ruthenium and the alloying material may be sufficient to provide hydrogen separation, however, additional layers of Pd, Ru and/or the alloying material, in any combination, may be added. Following the layering steps, the multilayered membrane is dried as described above.

In an embodiment, ruthenium is used as the first alloying material. In an embodiment, the palladium is applied to the activated substrate as described above. In certain embodiments, the palladium film is repaired using the repair technique discussed above. In an embodiment, ruthenium is applied to the palladium substrate using electroless plating. As discussed above, any suitable bath parameter for ruthenium may be used. Ruthenium provides added strength to the layered films applied to the substrate. By increasing the strength, fewer layers may be used, thereby increasing the hydrogen flux while decreasing the nitrogen flux through the membrane. Ruthenium can also reduce the number of layers and the thickness of layers used in either a binary layer system (Pd—Ru) or in a multilayer film (Pd—Ru-alloying metal(s)). Though ruthenium film layers may be dried, it is not necessary to anneal these layers.

In one embodiment, the palladium-ruthenium layers are further layered with a second alloying material as described above. The second alloying material can be gold, copper or silver and the second alloying material may be applied to the palladium-ruthenium system using an electroless plating process described above. A multilayer film of palladium-ruthenium-second alloying material can be created. As described above, the multilayer film may be dried intermittently throughout the layering process or at the completion of the layering process using the drying process described above.

One way to achieve Pd and other metal layers of approximately equal thickness is by performing the metal plating operations under substantially the same thermodynamic conditions and for appropriate periods, which has a large range of approximately 10 min to approximately 16 hours. It is also possible to perform the plating operations under different thermodynamic conditions and/or over different periods of time and achieve layers of substantially equal thickness. As noted above, the maximum hydrogen flux for Pd alloys is achieved with different weight percentages of different metal constituents. Consequently, the conditions under which weight percentages are achieved that are at, or near, the weight percentages for maximum hydrogen flux are typically different than those for the PdAu alloy.

An optional further step may increase the hydrogen flux of the membrane. Namely, the composite membrane may be subjected to air oxidation and reduction to activate the metal surface. This step is believed to roughen the surface of the film, thereby increasing the surface area of the film. The increased surface area is believed to provide a greater hydrogen flux. The increased surface is believed to be responsible for the greater hydrogen flux. In an embodiment, a short duration (about 5 to about 30 minutes) air oxidation at temperatures above about 300° C. followed by exposure to $H_2$ and subsequent reduction. Rather than air reduction and oxidation, the composite membrane can be subjected to $O_2$, $O_3$, acids, steam, $SO_2$, or a combination of $H_2S$/steam to disturb the surface of the palladium alloy film.

There are many possible applications of the invention. For example, there is great interest in using high temperature membranes in devices to separate and produce high purity hydrogen from a variety of sources including the reforming of hydrocarbon fuels and gasification of coal and biomass. For example, coal can be gasified to produce synthesis gas containing mostly carbon monoxide (CO), steam, $N_2$, and hydrogen. This synthesis gas is usually sent to a water gas shift (WGS) reactor to convert carbon monoxide and steam to carbon dioxide and hydrogen. The hydrogen can be separated using a Pd membrane, leaving the non-permeating $CO_2$ product at pressure.

Even more interesting is the case where the WGS reaction is performed within the hydrogen permeable membrane, where a membrane reactor will simultaneously produce pure hydrogen and a highly enriched $CO_2$ stream, still at high pressure, that could be used for tertiary oil and gas production and/or sequestered.

Another possible application of the invention is for the U.S. Military. The Military may use fuels like light alcohols (e.g. methanol and ethanol) as a hydrogen storage fluids for portable power needs. These alcohols can be easily reformed to make synthesis gas, which can be further processed to maximize the yield of hydrogen. This hydrogen can power fuel cells to produce electricity. A portable device like this would significantly reduce the weight of the batteries a soldier would have to carry into the field.

EXAMPLES

Example 1

Figure 2:
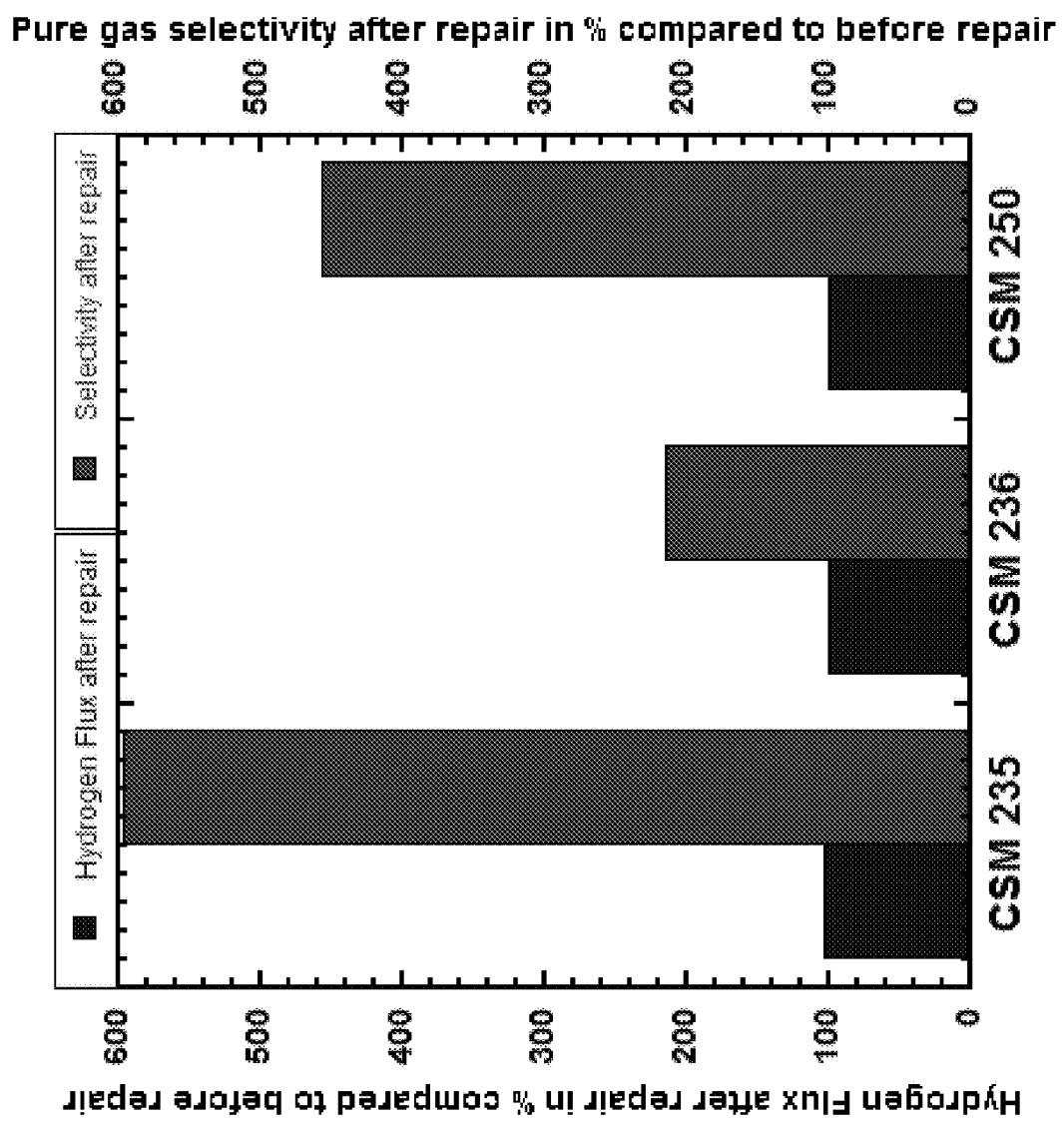
FIG. 2 illustrates the comparison of hydrogen flux and pure gas selectivity of three composite Pd membranes before and after repair.

FIG. 2 illustrates three samples of membranes and the effect on the hydrogen flux and pure gas selectivity. The tests were run at a temperature of about 400° C. The feed pressure was about 32 psig and the permeate pressure was approximately 12 psig. The hydrogen flux for each sample after repair compared to the hydrogen flux before repair remained unchanged. The pure gas selectivity for each sample after repair compared to before the repair increased significantly.

Example 2

Figure 3:
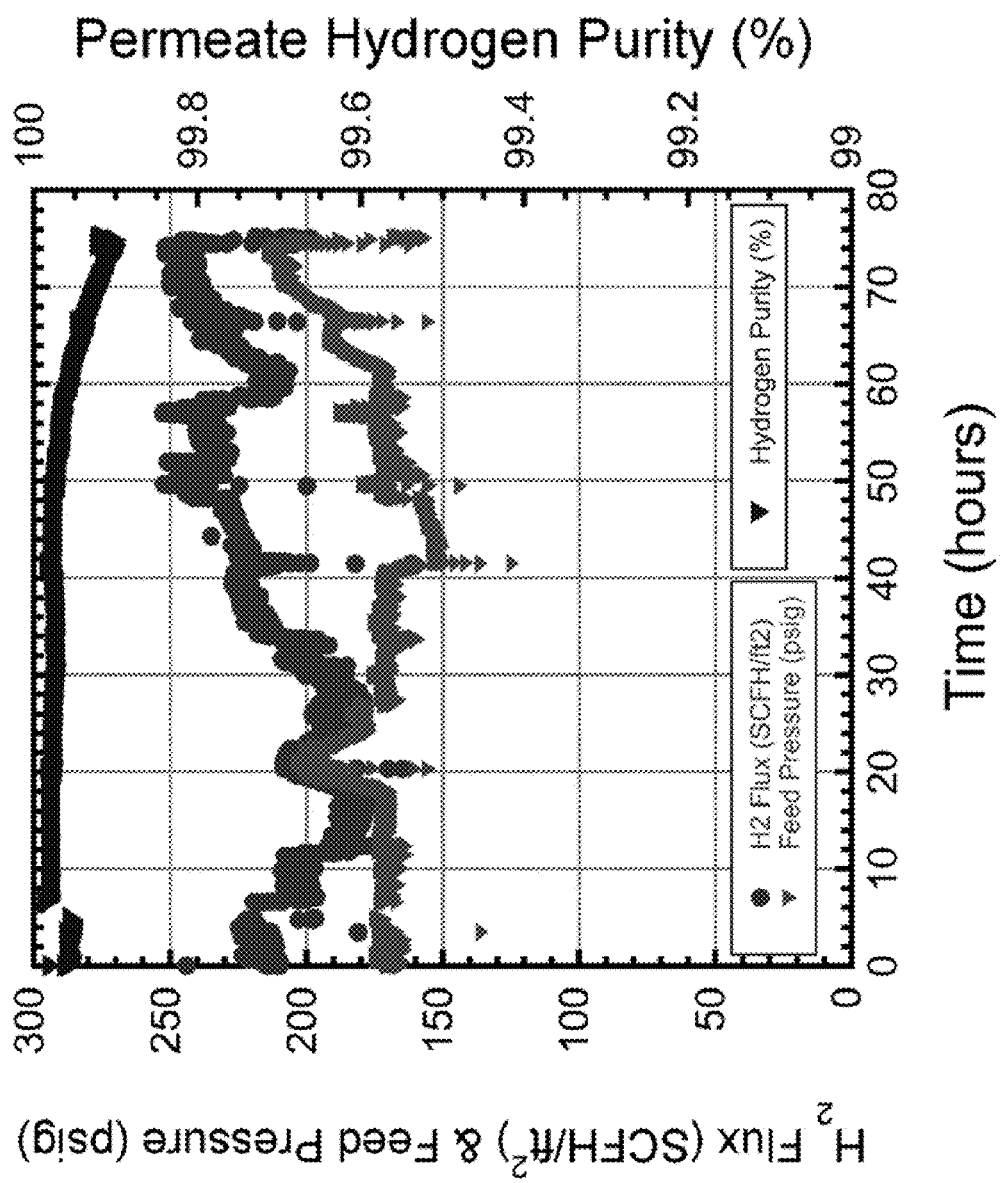
FIG. 3 illustrates the effect of time on hydrogen purity of a single repair $Pd_{96}Au_4$ 2.4 μm membrane.

FIG. 3 illustrates a single repair $Pd_{96}Au_4$ 2.4 μm membrane. FIG. 3 illustrates the effect of the hydrogen permeate hydrogen purity through the membrane as a function of time and the hydrogen flux and feed pressure as a function of time. The feed stream comprised approximately 50% hydrogen gas, about 19% steam, about 30% carbon dioxide and about 1% carbon monoxide. The feed temperature was about 400° C. and the average feed pressure was about 182 psia and the average permeate pressure was about 12 psia. FIG. 3 shows a slight decrease in the amount of hydrogen purity over time, however the purity remained above about 99.8% purity.

Example 3

Figure 4:
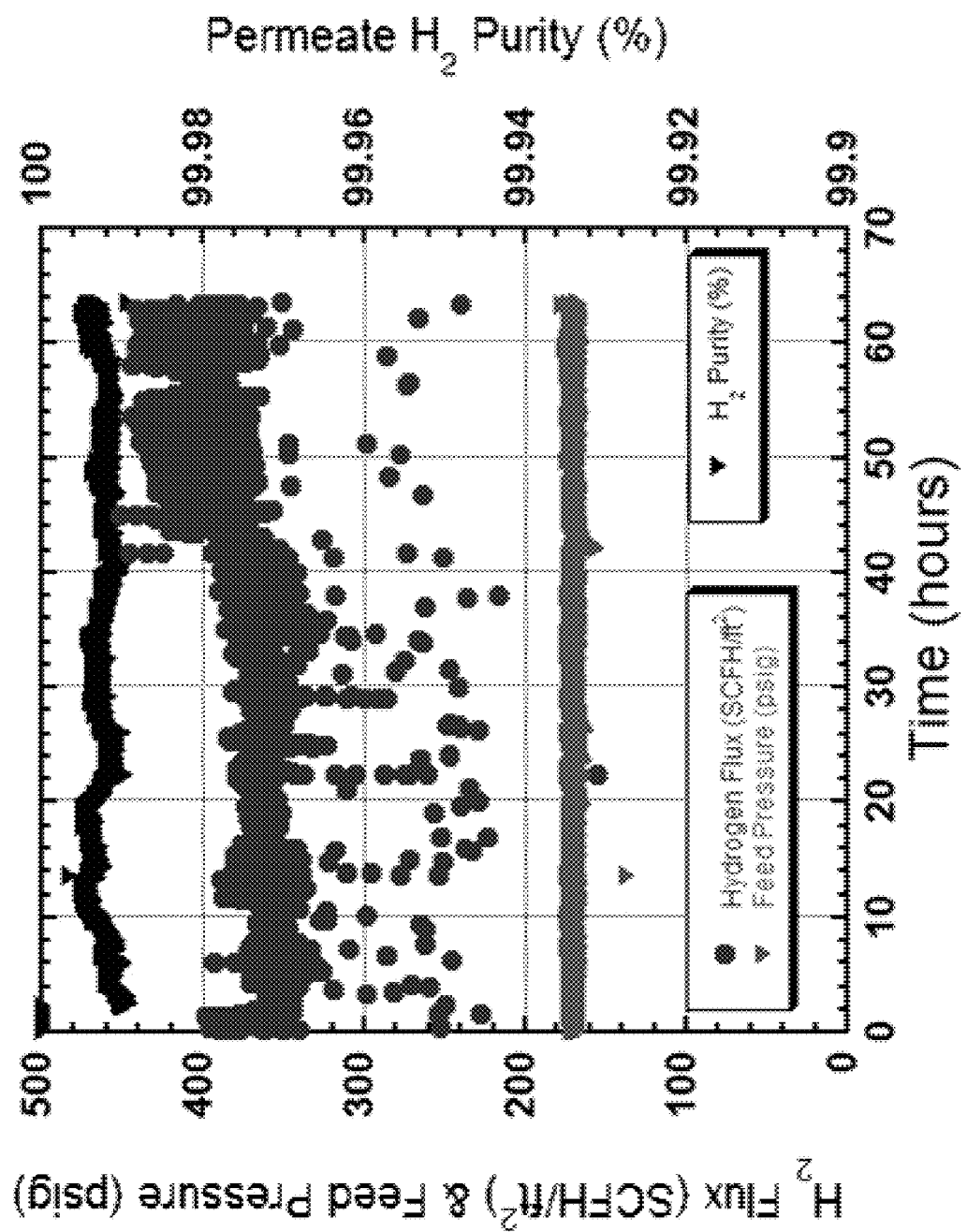
FIG. 4 illustrates the effect of time on hydrogen purity and flux of an intersitiial repair of a $Pd_{95}Au_5$ 3.3 μm membrane.
Figure 5:
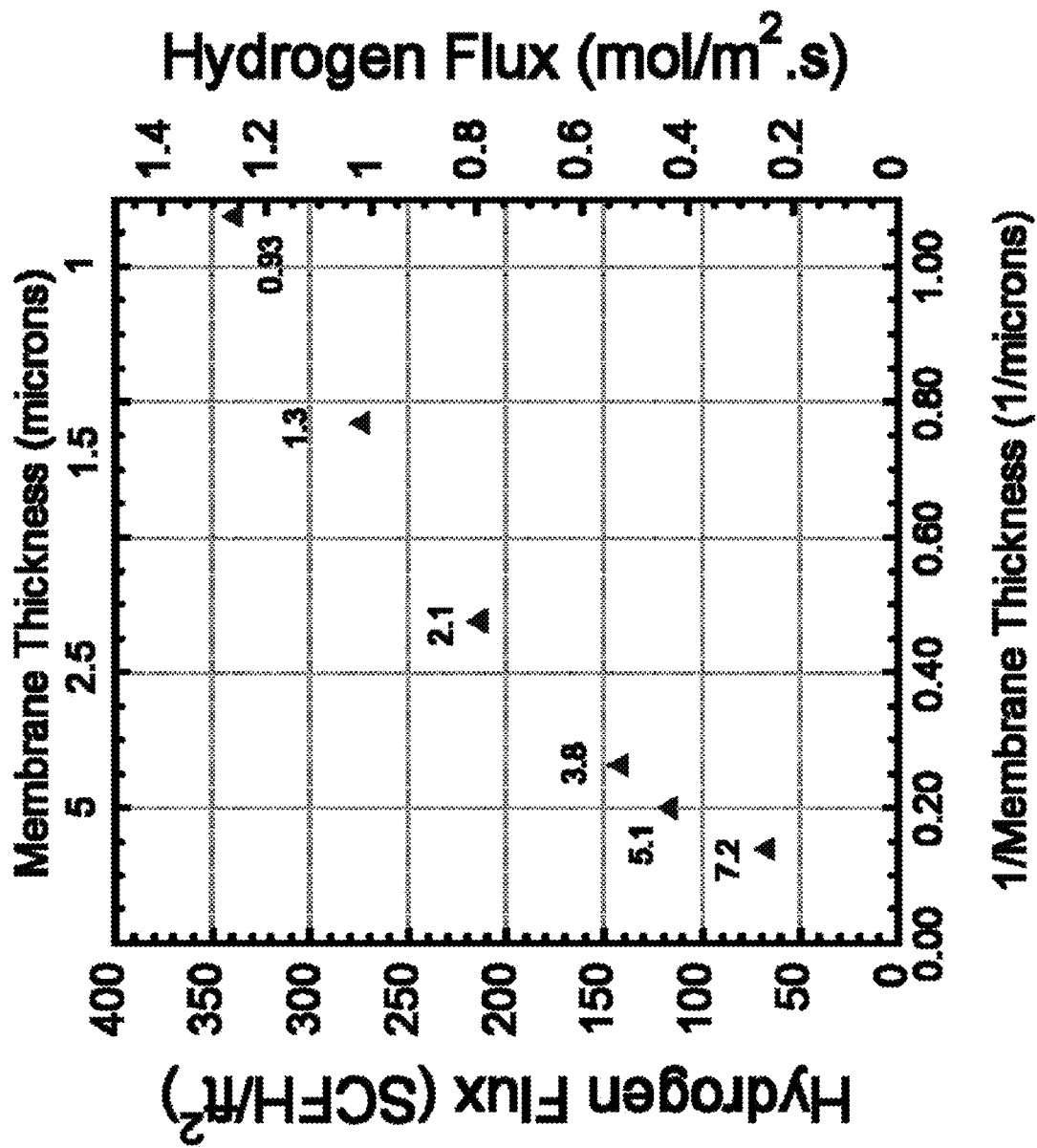
FIG. 5 illustrates the effect of membrane thickness on flux.

FIG. 4 illustrates an intersitiial repair of a $Pd_{95}Au_5$ 3.3 μm membrane. FIG. 5 illustrates the effect of the hydrogen permeate hydrogen purity through the membrane as a function of time and the hydrogen flux and feed pressure as a function of time. The feed stream comprised approximately 50% hydrogen gas, about 19% steam, about 30% carbon dioxide and about 1% carbon monoxide. The feed temperature was about 400° C. and the average feed pressure was about 182 psia and the average permeate pressure was about 12 psia. FIG. 5 shows that the hydrogen purity remains fairly constant over time.

Example 4

The hydrogen flux through these Pd alloy membranes is inversely proportional to the thickness of the membrane and therefore, thinner Pd alloy membranes are more desirable for their increased rate of hydrogen flux and lower cost for the palladium and alloy metal components. FIG. 5 illustrates the effect of the thickness of the membrane and the relationship with flux. The membranes were on AccuSep® SS supports. The permeation measurements were performed at 32 psia feed pressure with 12 psia permeate pressure.

Example 5

Figure 6:
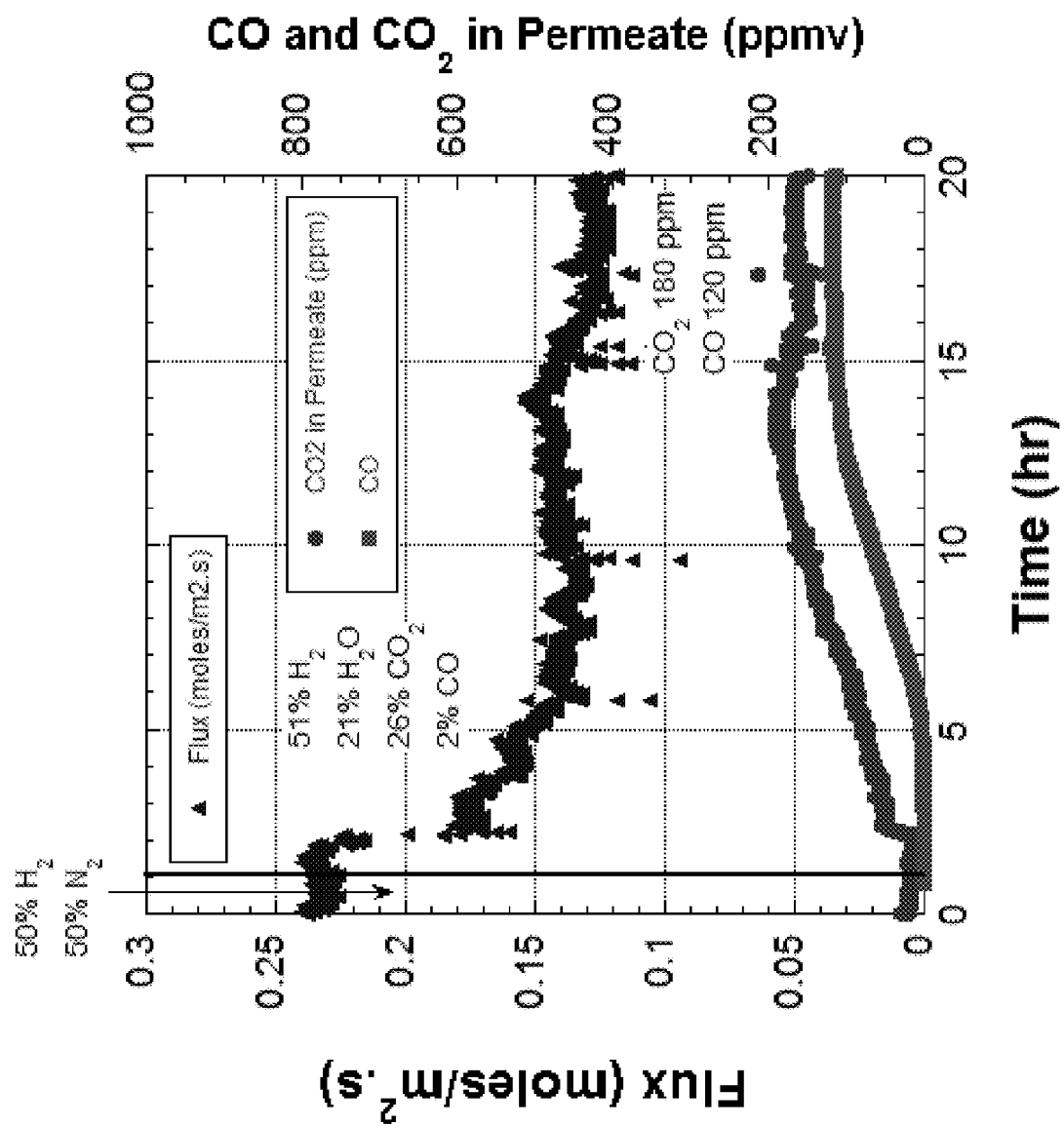
FIG. 6 illustrates the effect of flux and carbon monoxide and carbon dioxide permeate on a pure palladium membrane prepared without the use of the layered repair technique.

A 2.2 μm pure palladium membrane was prepared without the use of the layered repair technique illustrated in FIG. 6. FIG. 6 illustrates the testing of the pure palladium membrane where the feed stream is approximately 51% hydrogen gas, about 21% H2O, about 26% carbon dioxide and about 2% carbon monoxide.

Figure 7:
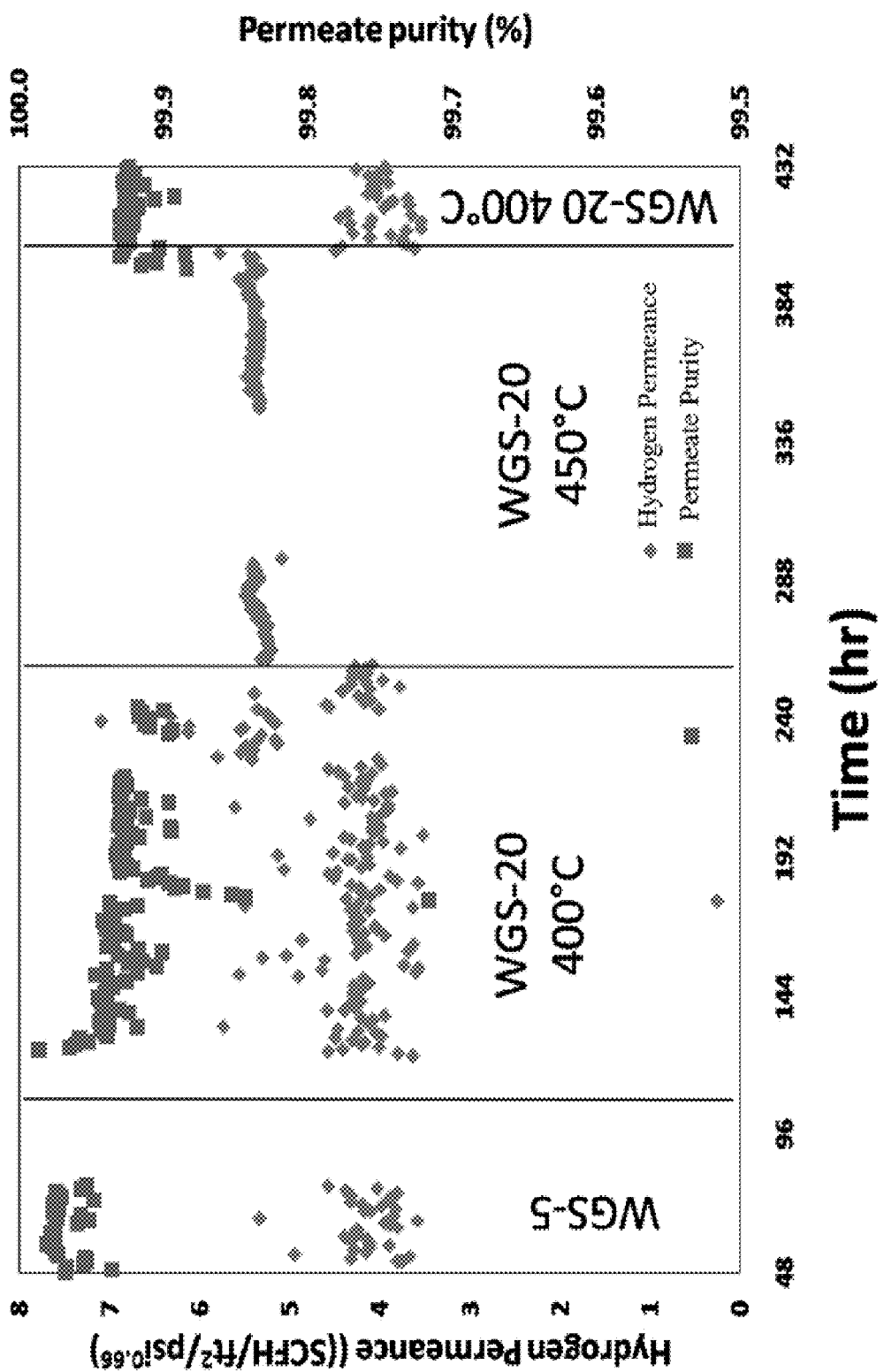
FIG. 7 illustrates the effect of hydrogen permeance and permeate purity overtime and the effect of temperature on a palladium-gold multilayer membrane.

The pure palladium membrane does not have the same durability in mixed gas systems as a similar thickness membrane made with the multilayer gold and repair technique illustrated in FIG. 7. The membrane of FIG. 7 is a 2.2 μm $Pd_{87}Au_{13}$ membrane.

The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant art, are within the scope of the present invention. The embodiment described hereinabove is further intended to explain the best mode known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

What is claimed is:

1. A method of fabricating a sulfur-resistant composite metal membrane without tin or EDTA, comprising:
   seeding a substrate with palladium crystallites;
   decomposing an organic ligand present on the substrate;
   reducing the palladium crystallites to a metallic form;
   depositing a first film of palladium metal on the substrate;
   depositing a second metal film on the first film, wherein a material of the second metal film is selected from the group consisting of gold, ruthenium, silver and copper;
   depositing additional layers of palladium metal and depositing additional layers of the second metal film to form a multilayer film of palladium and the second metal film; and,
   drying of the multilayer film at a temperature above about 130° C. to form a sulfur-resistant composite Pd-metal alloy multilayer film membrane.

2. The fabrication method of claim 1, wherein the sulfur-resistant composite Pd-metal alloy multilayer film has a total thickness between about 2 μm and about 10 μm.

3. The fabrication method of claim 1, wherein the substrate is a stainless steel support having a porous $ZrO_2$ coating.

4. The fabrication method of claim 1, wherein at least one portion of the substrate has been sealed with a low temperature glaze.

5. The fabrication method of claim 1, wherein the seeding step comprises airbrushing a palladium salt solution onto a surface of the substrate.

6. The fabrication method of claim 5, wherein the palladium salt solution is a solution consisting of Palladium (II) Acetate and chloroform.

7. The fabrication method of claim 1, wherein the decomposition step comprises firing the substrate comprising the palladium crystallites at an elevated temperature sufficient to eliminate any organic ligand present.

8. The fabrication method of claim 1, wherein the reducing step comprises immersing the substrate in a reducing solution.

9. The fabrication method of claim 8, wherein the reducing solution is a solution consisting of water, $NH_3OH$ and hydrazine.

10. The fabrication method of claim 1, wherein the step of depositing the first film of palladium metal comprises pumping a palladium plating bath over a surface of the substrate.

11. The fabrication method of claim 10, wherein the palladium plating bath is a solution consisting of water, $NH_3OH$, HCl, Palladium (II) chloride and hydrazine.

12. The fabrication method of claim 10, wherein the pumping continues until a palladium layer having a thickness of between about 0.7 μm and about 1.5 μm is formed.

13. The fabrication method of claim 1, wherein the step of depositing the second metal film comprises pumping a second metal plating bath over a surface of the substrate.

14. The fabrication method of claim 13, wherein the second metal is gold, and wherein a gold plating bath is a solution consisting of water, NaOH and gold (III) chloride.

15. The fabrication method of claim 13, wherein the pumping continues until the second metal film having a thickness of between about 0.2 μm and about 0.5 μm is formed.

16. The fabrication method of claim 1, further comprising depositing a third film of silver on the second metal film.

17. The fabrication method of claim 16, wherein the step of depositing a third film of silver comprises pumping a silver plating bath consisting of silver nitrate, $NH_3OH$ and water over a surface of the substrate.

18. The fabrication method of claim 1, wherein the first film of palladium metal and the second metal film are deposited sequentially to form the multilayer film having a total thickness of 3 μm to 10 μm.

19. The fabrication method of claim 1, further comprising:
repairing the first film of palladium metal and the additional layers of palladium metal within the multilayer film.

20. A sulfur-resistant Pd-metal multilayer composite membrane comprising:
a substrate;
a multilayer film on the substrate;
wherein the multilayer film comprises between three to seven layers of palladium metal and between three to seven layers of a second metal film, wherein a thickness of the multilayer film is between about 3 microns and about 10 microns, and wherein the multilayer film has minimal carbon impurities because EDTA or tin are not used during manufacturing of the multilayer film.

21. The membrane of claim 20, wherein a material of the second metal film is selected from the group consisting of ruthenium, silver, gold, platinum and copper.

* * * * *